Oct. 4, 1955
C. W. JOHNSTON
2,719,726
VEHICLE WHEEL SUSPENSION
Filed July 24, 1953
2 Sheets-Sheet 1
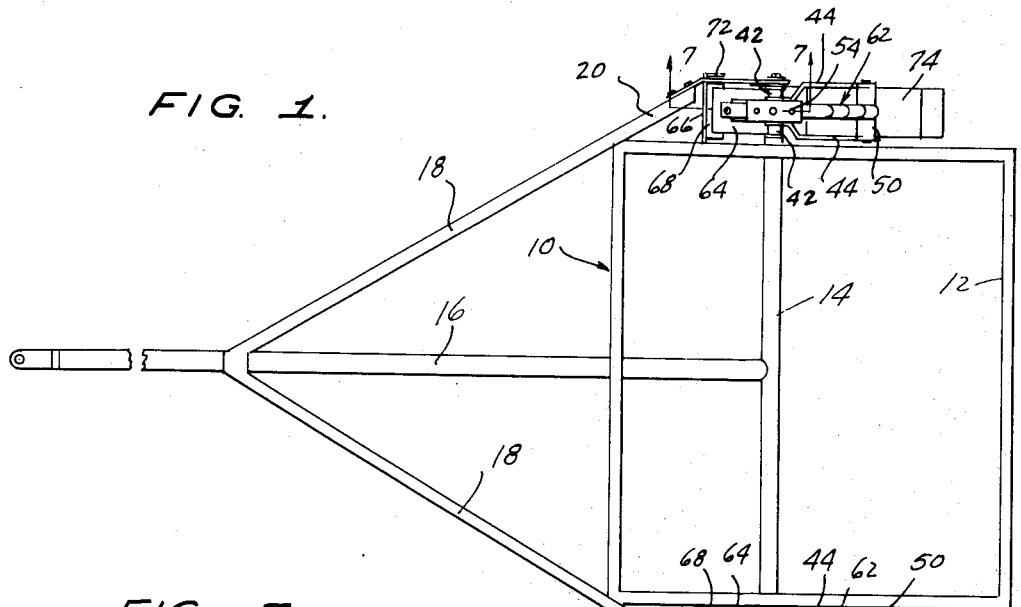
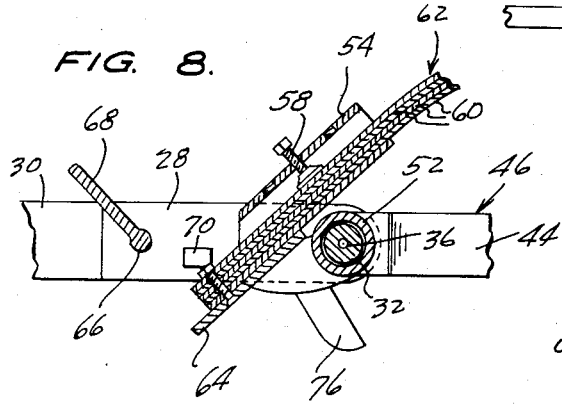
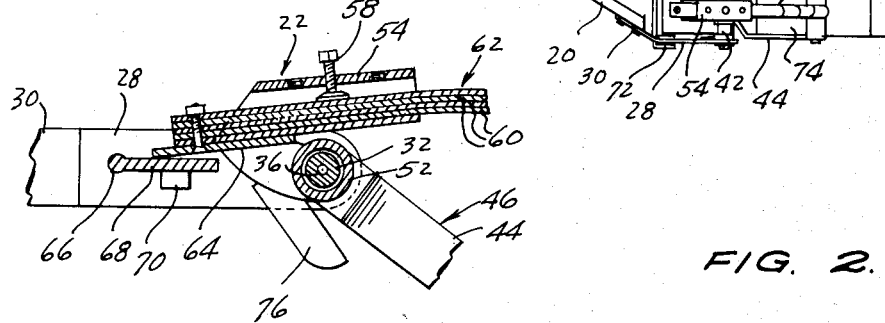
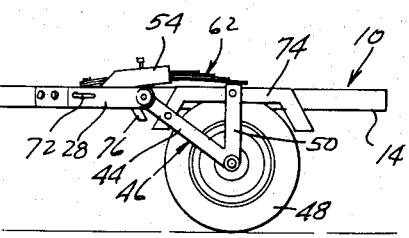
INVENTOR.
CHARLES W. JOHNSTON,
BY
McMorrow, Berman + Davidson
ATTORNEYS Oct. 4, 1955
C. W. JOHNSTON
2,719,726
VEHICLE WHEEL SUSPENSION
Filed July 24, 1953
2 Sheets-Sheet 2
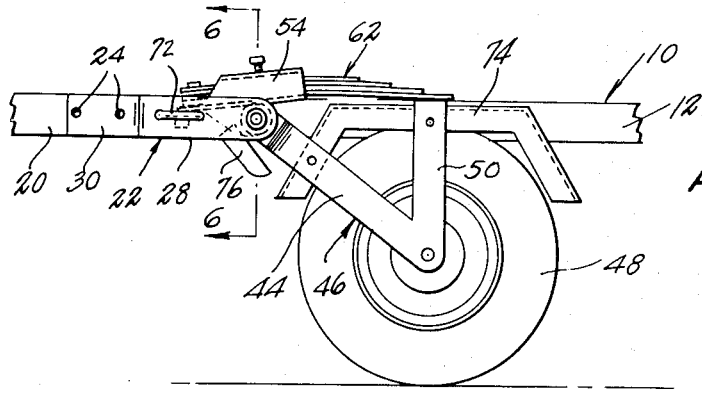
FIG. 3.
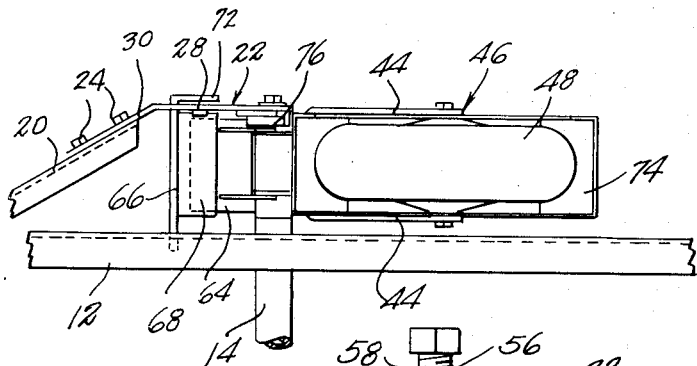
FIG. 4.
FIG. 6.
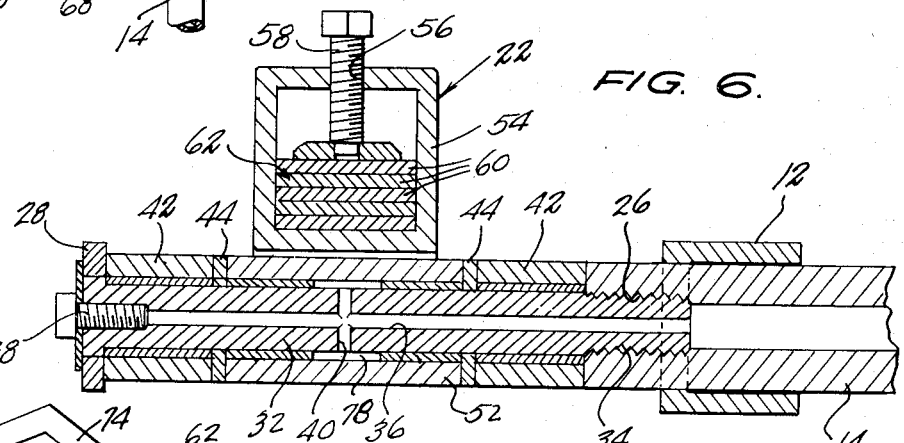
FIG. 5.
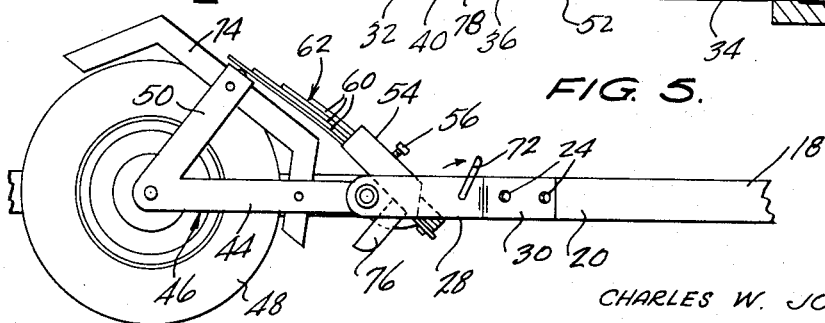
INVENTOR.
CHARLES W. JOHNSTON,
BY
McMorrow, Berman + Davidson
ATTORNEYS United States Patent Office 2,719,726
Patented Oct. 4, 1955

2,719,726

VEHICLE WHEEL SUSPENSION

Charles Wesley Johnston, West Monroe, La.

Application July 24, 1953, Serial No. 370,003

8 Claims. (Cl. 280—43)

This invention relates to a vehicle wheel suspension and has for its primary object to support a vehicle in elevated position during the transportation of a load thereon and the lowering of the frame during the periods of loading and unloading it.

In the transportation of certain items, particularly boats, it is necessary, in order to load the boat on a trailer or the like, to lower the supporting frame of the trailer and then to subsequently elevate the supporting frame during the period that the load is being transported. Trailers of the type to which this invention relates are particularly useful in transporting over land behind a traction vehicle a boat or the like.

Another object of this invention is to suspend the load on springs to prevent the transmission of road shocks from the wheels of the trailer to the load.

In the drawings:

Figure 1 is a plan view of a trailer vehicle equipped with this improved spring suspension;

Figure 2 is a fragmentary side view of Figure 1;

Figure 3 is a fragmentary enlarged side view of the trailer vehicle;

Figure 4 is a bottom plan view of Figure 3;

Figure 5 is a side view similar to Figure 3, showing the parts in another position;

Figure 6 is a fragmentary enlarged sectional view taken substantially on the line 6—6 of Figure 3;

Figure 7 is a fragmentary enlarged sectional view taken substantially on the line 7—7 of Figure 1; and Figure 8 is a view similar to Figure 7, showing the parts in loaded position.

Referring to the drawings in detail, a trailer vehicle designated generally 10 comprises a frame 12 carrying a transversely extending axle 14 and having a tongue 16 which is adapted to be connected to a traction vehicle behind which the trailing vehicle is towed. Connected to the tongue 16 and extending rearwardly therefrom are diverging braces 18, the rear ends of which project beyond the forward end of the frame 12 to provide arms 20 to which, my improved wheel suspension designated generally 22 is connected as by bolts 24.

Opposite ends of the axle 14 are internally screw threaded as at 26 to receive the threaded end of the spindle of the wheel suspension unit 22, as will be more fully hereinafter described.

The wheel suspension 22 comprises a side bar 28 carrying a mounting tongue 30 through which the bolts 24 extend, and carried by the side bar 28 and extending perpendicularly therefrom remote from the mounting tongue 30 is a spindle 32 carrying at the end remote from the side bar 28 an externally screw threaded boss 34 which is adapted to threadedly engage the threads 26 of the axle 14. Extending longitudinally through the spindle 32 is an axial bore 36, the end of which remote from the axle 14 is closed by a suitable plug 38, and extending diametrically through the spindle 32 intermediate the ends thereof is a bore 40 which communicates with the bore 36 and serves as a distributor for lubrication, as will be readily understood upon reference to the drawings.

Mounted for rocking movement about the spindle 32 adjacent opposite ends thereof are hubs 42 carrying arms 44 which normally extend downwardly and rearwardly from the spindle and cooperate to define a fork 46 in which is mounted for rotation a ground wheel 48. Carried by and extending angularly from the arms 44 is an inverted U-shaped yoke 50 which joins the arms adjacent the axis of the wheel 48 and forms a stop for the leaf spring, to be more fully hereinafter described.

Mounted for rocking movement on the spindle 32 between the hubs 42 is a hub 52 carrying a spring housing 54 which constitutes a substantially rectangular sleeve, the axis of which lies above and perpendicular to the axis of the spindle 32, and formed in the top of the housing 54 is an internally screw threaded opening 56 for the reception of a clamp screw 58, by means of which the leaves 60 of a leaf spring designated generally 62 are clampingly held in the spring housing 54. As illustrated in the drawings, the leaves of the spring 62 are coterminous adjacent the forward end of the spring housing while the opposite ends of the springs progressively diminish in length with the shorter of the springs being at the top. The bottommost leaf 60 of the spring 62 intersects the path of movement of the yoke 50 and engages said yoke in order to sustain the weight of the vehicle on the ground wheel. Carried by the spring housing 54 and extending forwardly therefrom for movement with the hub 52 in a vertical arcuate path in advance of the spring 62 is a tongue 64 which, as the spring housing 54 rocks about the axis of the spindle 32, moves in an arcuate path between the side bar 28 and the frame 12. Mounted for oscillatory movement in the side bar 28 and extending through the adjacent bar of the frame 12 is a shaft 66 carrying a leaf 68 which, when in the position illustrated in Figure 7, rests on a stop lug 70 carried by the side bar 28 and intersects the path of movement of the tongue 64 so as to arrest downward movement of the spindle 32 and consequently the frame 12 of the vehicle about the axis of the wheel 48. A handle 72 is carried by the shaft 66 for oscillatory movement adjacent the side of the side bar 28 remote from the frame 12 and is adapted to oscillate the shaft 66 to move the leaf 68 into and out of the path of movement of the tongue 64.

Carried by the fork 46 and yoke 50 is a fender 74 which is adapted to move with the fork and yoke in an arcuate path concentric about the periphery of the wheel 48, and welded or otherwise secured to the side bar 28 and projecting downwardly and rearwardly therefrom is a stop finger 76, the lower end of which intersects the path of movement of the fender 74 to engage the fender when the vehicle is being backed and prevent the wheels from buckling beneath the frame. This stop finger also intersects the path of movement of the tongue 64 to arrest downward movement thereof about the spindle 32 when the parts have attained a predetermined position in which loading of the trailer may take place.

Each spindle 32 is surrounded by bearing bushings which are spaced longitudinally from one another to define an annular passage 78 which communicates with the bore 36 through the transverse bore 40 to receive lubricants and distribute it on the bearing surfaces between the bushings and the spindle 32 and also between the hubs 42 and 52 and their respective bearing bushings.

In use, when it is desired to load the trailing vehicle, the vehicle is lifted so that the tongues 64 disengage the leaves 68 and the handles 72 are turned to rock the stop leaves 68 upwardly, as illustrated in Figure 8 which permits the spring housings 54 to rock about their respective spindles 32 into the position illustrated in Figures 5 and 8, to thereby drop the spindles until the tongues 64 encounter the stops 76, at which time the frame 12 will have attained its lowermost position for loading. Once a load has been mounted on the trailer, lifting effort is exerted on the frame adjacent the spindles and the spindles 32 are moved upwardly in an arcuate path about the axis of the wheels 40 which upward movement simultaneously rocks the springs 62 about the axis of the spindles 32 until the tongue 64 is high enough to permit the stop leaves 68 to be turned into the horizontal position substantially shown in Figure 7 and into the path of movement of the tongues 64, so that with the stop leaves 68 bearing on the stop lugs 70 carried by the side bars 28, the springs will be held in the uppermost position, as illustrated in Figures 2 and 3, so that the load may be transported at a height sufficient to avoid engagement with any obstacles which might be in the roadway. Obviously, the weight of the load is suspended on the springs 62 and as a result the load imposed on the frame 12 will be protected from road shock. Because of the fact that the stop fingers 76 extend into the path of movement of the fenders 74, it will be evident that when backing the trailing vehicle, the stop fingers will engage the fender and prevent collapse of the wheels 48 beneath the vehicle.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A wheel suspension comprising a side bar adapted to be coupled to a vehicle frame in spaced parallel relation thereto, a spindle carried by the side bar and connected to the vehicle frame, a fork carried by the spindle to move in a vertical arcuate path adjacent the vehicle frame, a ground wheel carried by the fork for rotation about an axis which lies parallel to the axis of the spindle, a leaf spring carried intermediate its ends by the spindle for rocking movement thereabout, one end of said spring being movable in an arcuate path which intersects the path of movement of the fork for operatively engaging said fork and yieldingly arresting movement thereof upwardly in its arcuate path, a stop carried by the side bar and movable into and out of the path of movement of the end of the spring remote from that which operatively engages the fork, and a second stop carried by the side bar and extending into the path of movement of the end of the spring remote from that which engages the fork to limit the movement of the spring when the frame of the vehicle attains a predetermined lowered position.

2. A wheel suspension comprising a side bar adapted to be coupled to a vehicle frame in spaced parallel relation thereto, a spindle carried by the side bar and connected to the vehicle frame, a fork carried by the spindle to move in a vertical arcuate path adjacent the vehicle frame, a ground wheel carried by the fork for rotation about an axis which lies parallel to the axis of the spindle, a yoke carried by the fork in straddling relation to the wheel and extending upwardly therefrom for movement with said fork in an arcuate path about the axis of the spindle, a leaf spring carried intermediate its ends by the spindle for rocking movement thereabout, one end of said spring bearing on the yoke for yieldingly arresting upward movement of the fork, a stop carried by the side bar and movable into and out of the path of movement of the end of the spring remote from that which engages the yoke, and a second stop carried by the side bar and extending into the path of movement of the end of the spring remote from that which engages the yoke to limit the movement of the spring when the frame of the vehicle attains its lowered position.

3. A wheel suspension comprising a side bar adapted to be coupled to a vehicle frame in spaced parallel relation thereto, a spindle carried by the side bar and connected to the vehicle frame, a fork carried by the spindle to move in a vertical arcuate path adjacent the vehicle frame, a ground wheel carried by the fork for rotation about an axis which lies parallel to the axis of the spindle, a yoke carried by the fork in straddling relation to the wheel and extending upwardly therefrom for movement with said fork in an arcuate path about the axis of the spindle, a leaf spring carried intermediate its ends by the spindle for rocking movement thereabout, one end of said spring bearing on the yoke for yieldingly arresting upward movement of the fork, a leaf carried by the side bar and movable into and out of the path of movement of the end of the spring remote from that which engages the yoke, a fender carried by the yoke for movement therewith in an arcuate path concentric about the periphery of the wheel, and a stop finger carried by the side bar and extending into the path of movement of the fender for engaging the fender and arresting movement of the wheel about the spindle in one direction.

4. A wheel suspension comprising a side bar adapted to be coupled to a vehicle frame in spaced parallel relation thereto, a spindle carried by the side bar and connected to the vehicle frame, a fork carried by the spindle to move in a vertical arcuate path adjacent the vehicle frame, a ground wheel carried by the fork for rotation about an axis which lies parallel to the axis of the spindle, a yoke carried by the fork in straddling relation to the wheel and extending upwardly therefrom for movement with said fork in an arcuate path about the axis of the spindle, a leaf spring carried intermediate its ends by the spindle for rocking movement thereabout, one end of said spring bearing on the yoke for yieldingly arresting upward movement of the fork, a leaf carried by the side bar and movable into and out of the path of movement of the end of the spring remote from that which engages the yoke, a fender carried by the yoke and extending across the top of the wheel in spaced relation to the periphery thereof, a stop finger carried by the side bar and extending into the path of movement of the fender for engaging the fender and arresting movement of the wheel about the spindle in one direction, and said stop finger extending into the path of movement of the end of the spring remote from that which engages the yoke to limit the movement of the spring when the frame of the vehicle attains its lowered position.

5. A vehicle wheel suspension comprising a ground wheel, a fork carried by the ground wheel for movement in an arcuate path which lies in concentric spaced relation to the periphery of the ground wheel from an active load transporting position in which it inclines upwardly to an inactive loading and unloading position in which it extends substantially horizontally, a yoke carried by the fork for movement therewith, said yoke extending outwardly from the fork adjacent the axis of the wheel, a spindle carried by the fork in spaced relation to the axis of the wheel and connected to a vehicle frame for supporting said frame on the wheel, a leaf spring carried by the spindle for movement in an arcuate path which intersects the path of movement of the yoke to engage said yoke and yieldingly suspend the spindle on the wheel, and a leaf carried by the frame and movable into and out of the path of movement of the end of the spring remote from the yoke for engaging the spring and arresting movement thereof in its arcuate path when the fork is in its active position.

6. A vehicle wheel suspension comprising a ground wheel, a fork carried by the ground wheel for movement in an arcuate path which lies in concentric spaced relation to the periphery of the ground wheel from an active load transporting position in which it inclines upwardly to an inactive loading and unloading position in which it extends substantially horizontally, a yoke carried by the fork for movement therewith, said yoke extending outwardly from the fork adjacent the axis of the wheel, a spindle carried by the fork in spaced relation to the axis of the wheel and connected to a vehicle frame for supporting said frame on the wheel, a leaf spring carried by the spindle for movement in an arcuate path which intersects the path of movement of the yoke to engage said yoke and yieldingly suspend the spindle on the wheel, a leaf carried by the spindle and movable into and out of the path of movement of the end of the spring remote from the yoke for engaging the spring and arresting movement thereof in its arcuate path when the fork is in its active position, and a second stop finger carried by the frame and extending into the path of movement of the end of the spring remote from the yoke for engaging the spring and arresting downward movement of the frame when it attains its lowered loading position.

7. A vehicle wheel suspension comprising a ground wheel, a fork carried by the ground wheel for movement in an arcuate path which lies in concentric spaced relation to the periphery of the ground wheel from an active load transporting position in which it inclines upwardly to an inactive loading and unloading position in which it extends substantially horizontally, a yoke carried by the fork for movement therewith, said yoke extending outwardly from the fork adjacent the axis of the wheel, a spindle carried by the fork in spaced relation to the axis of the wheel and connected to a vehicle frame for supporting said frame on the wheel, a leaf spring carried by the spindle for movement in an arcuate path which intersects the path of movement of the yoke to engage said yoke and yieldingly suspend the spindle on the wheel, a leaf carried by the spindle and movable into and out of the path of movement of the end of the spring remote from the yoke for engaging the spring and arresting movement thereof in its arcuate path when the fork is in its active position, a fender carried by the yoke for movement therewith in concentric spaced relation to the periphery of the wheel, and a stop finger carried by the frame and extending into the path of movement of the fender for engaging the fender and arresting movement of the fork about the spindle in one direction.

8. A vehicle wheel suspension comprising a ground wheel, a fork carried by the ground wheel for movement in an arcuate path which lies in concentric spaced relation to the periphery of the ground wheel from an active load transporting position in which it inclines upwardly to an inactive loading and unloading position in which it extends substantially horizontally, a yoke carried by the fork for movement therewith, said yoke extending outwardly from the fork adjacent the axis of the wheel, a spindle carried by the fork in spaced relation to the axis of the wheel and connected to a vehicle frame for supporting said frame on the wheel, a leaf spring carried by the spindle for movement in an arcuate path which intersects the path of movement of the yoke to engage said yoke and yieldingly suspend the spindle on the wheel, a leaf carried by the spindle and movable into and out of the path of movement of the end of the spring remote from the yoke for engaging the spring and arresting movement thereof in its arcuate path when the fork is in its active position, a fender carried by the yoke for movement therewith in concentric spaced relation to the periphery of the wheel, a stop finger carried by the frame and extending into the path of movement of the fender for engaging the fender and arresting movement of the fork about the spindle in one direction, and said stop finger extending into the path of movement of the end of the spring remote from the yoke for engaging the spring and yieldingly supporting the fork in substantial alignment with the frame.

References Cited in the file of this patent

UNITED STATES PATENTS

| | | |
|---|---|---|
| 2,141,718 | Allen | Dec. 27, 1938 |
| 2,648,546 | Falkenhagen | Aug. 11, 1953 |